United States Patent [19]

Yang

[11] Patent Number: 4,569,852

[45] Date of Patent: * Feb. 11, 1986

[54] MAINTENANCE OF FLAVOR INTENSITY IN PRESSED TABLETS

[75] Inventor: Robert K. Yang, Morris Plains, N.J.

[73] Assignee: Warner-Lambert Company, Morris Plains, N.J.

[*] Notice: The portion of the term of this patent subsequent to May 15, 2001 has been disclaimed.

[21] Appl. No.: 525,776

[22] Filed: Aug. 23, 1983

[51] Int. Cl.$^4$ ............................................. A23G 3/00
[52] U.S. Cl. ................................... 426/534; 426/650; 426/651; 426/454; 426/660; 426/658
[58] Field of Search ................ 426/103, 96, 454, 650, 426/651, 533, 534, 660, 658

[56] References Cited

U.S. PATENT DOCUMENTS

| | | | |
|---|---|---|---|
| 3,832,473 | 8/1974 | Sahaydak | 426/660 |
| 4,127,645 | 11/1978 | Witzel | 426/660 |
| 4,448,789 | 5/1984 | Yang | 426/533 |

Primary Examiner—Jeanette Hunter
Attorney, Agent, or Firm—Gary M. Nath; Daniel A. Scola, Jr.

[57] ABSTRACT

The flavor intensity of pressed tablets can be enhanced by combining the flavoring agents with certain hydrophilic polymers.

8 Claims, No Drawings

MAINTENANCE OF FLAVOR INTENSITY IN PRESSED TABLETS

The present invention relates to a flavored pressed tablet and more particularly to flavored pressed tablets having a high flavor intensity.

Compressed or pressed tablets generally contain high amounts of water-soluble sweeteners such as sucrose and corn syrup or in sugarless tablets, sorbitol, mannitol, and artificial sweeteners. Also incorporated within the formulation may be flavoring agents, lubricants, binders disintegrating agents, coloring agents and so forth.

Compressed or pressed tablets, in contrast to boiled candy varieties, often display undesirable flavor qualities and have therefore met with little commercial success. In boiled candies, the flavor becomes entrapped within the hard candy mass and does not transfer through the mass.

The flavor problems associated with pressed tablets are however considered to be a function of the porous nature of the pressed product, since the porosity permits the migration of flavors into the air space surrounding the structure. The migration of flavor out of the tablet diminishes flavor intensity and perception rendering the product unacceptable.

Various attempts have been made to stabilize flavors in pressed mint formulations in order to prevent flavor escape. Flavoring materials stabilized by treatment with a special coating or encapsulation in water-soluble compositions, have been tried in pressed formulations. Unfortunately, the coating or encapsulating material surrounding the flavor oil in these products has been found to be incapable of withstanding the temperatures and pressures encountered in pressed mint manufacture. In usual manufacturing techniques, temperatures of 90° F. to 110° F. and pressures up to 12 tons per square inch are frequently used. These conditions apparently cause at least the partial disintegration and/or fracture of the stabilizing coatings and as such pressed mints containing such "stabilized" flavor oils have been found to suffer from the same disadvantages that occur when untreated flavor oils are used, that is loss of flavor.

The types of techniques and/or coatings used in the stabilized flavor oils which have proved ineffective in pressed mint formulations are many and varied. For example, U.S. Pat. No. 2,258,567 describes a gelatin-flavor oil mixture which when dried and ground, provides permanent conservation of flavors. In U.S. Pat. No. 2,369,847, an emulsion of the flavor is employed as an edible hydrophilic colloid (gelatin, pectin, polyvinyl alcohol, gums, etc.) which is dried and comminuted to form encapsulated micro-droplets or globules of volatile flavor. U.S. Pat. No. 2,857,281 describes the preservation of flavors by spray drying a hot emulsion of flavor oil in a sugar base, the base being a noncrystalline mixture of at least two different sugars. All of the above-described products are expensive to produce and none are completely satisfactory in pressed mint assortments.

U.S. Pat. No. 3,832,473 to Sahaydak avoided some of these difficulties by employing in a pressed mint a solid particulate flavor emulsion of the essential oil flavor in a mixture of corn syrup solids, an emulsifier and either glycerol, a nontoxic glycol or mixtures thereof.

The need however still exists for a pressed tablet that contains a stable encapsulated flavor which remains undistorted during the tablet pressing operation and exhibits enhanced flavor intensity and perception.

It has been unexpectedly discovered that the flavor intensity of a pressed tablet is significantly enhanced when the flavoring agent is combined with a hydrophilic polymer having specific properties. When combined in this manner, it has been found that the enhanced flavor intensity manifested by the flavoring compositions used in this invention are evident almost immediately upon tasting the sample and flavor oil loss is eliminated during the tabletting operation and storage of the product.

In particular, a flavored pressed tablet has been unexpectedly discovered which comprises a tablet formulation containing about 0.05 to about 10% by weight of a flavoring composition, said flavoring composition comprising a flavoring agent and a hydrophilic polymer, said hydrophilic polymer being characterized by (a) being water-soluble,
(b) being soluble in organic solvents,
(c) having a viscosity below 100 cps, 10% by weight at 25° C. in water, and
(d) being compatible with the flavoring agent.

By employing the flavoring composition described in a pressed tablet it has been found that such pressed tablet products are obtained in which flavor integrity is maintained and flavor migration and subsequent destruction of individual flavor oils does not occur.

The flavoring compositions utilized in this invention are described in copending U.S. patent application Ser. No. 412,323 entitled "Enhanced Flavor-Releasing Agent."

In particular, the hydrophilic polymer is described as being any non-toxic hydrophilic polymer provided the polymer has the characteristics of being (a) water-soluble,
(b) organic solvent soluble,
(c) of low viscosity, i.e., less than 100 centipoise (cps) at 25° C. in water in a 10% by weight solution, and
(d) compatible with the flavor agent.

The hydrophilic polymer is used in amounts of at least 3 parts by weight of polymer to 1 part by weight flavoring agent. Any amount above 3 parts by weight polymer may be used provided the polymer does not interfere with the flavor release. Preferred amounts of polymer may range from about 0.15% to about 40% by weight and most preferably from about 1.5% to about 18% by weight of the final pressed tablet.

Water solubility is essential to enable a rapid dissolution in saliva and concomitant high flavor intensity. Organic solvent solubility is essential to assist in forming a homogeneous blend of the flavoring agent with the hydrophilic polymer. Low viscosity is needed to enable easy incorporation in the tablet formulation while achieving storage stability by inhibiting flavor release. A particularly preferred hydrophilic polymer finding wide utility is polyvinylpyrrolidone. The hydrophilic polymers may be used alone with the flavoring agent or in combination with unsuitable hydrophilic polymers. Unsuitable polymers are those polymers which when used as the only polymer do not exhibit the four criteria enumerated above. They can, nevertheless be used to dilute or to blend with the hydrophilic polymers of choice. For example, polyvinylpyrrolidone may be used alone or in combination with similar yet unsuitable polymers such as hydroxypropyl cellulose, or ethylcellulose. Such supplemental or unsuitable polymers may be used in varying amounts. Suitable amounts of up to 50% or more by weight of acceptable hydrophilic polymer may be employed, with amounts of 1 to 20% by weight of acceptable hydrophilic polymer being preferred.

The flavoring agent-hydrophilic polymer combination is prepared by several means. One method involves dry mixing the two ingredients at a temperature from about 120° to 200° C. Mixing is continued until a homogenous mixture is prepared, which takes approximately 5 to 60 minutes. Once mixing is complete, the mass is cooled to prepare a hard brittle product which can either be stored for further processing or ground to a size suitable for use in a tablet composition. Cooling can be easily achieved by lowering the temperature of the formulation below 0° C. and preferably below 20° C. Once cooled, the flavoring composition may be stored or processed further, such as by grinding.

When ground, grinding is done to prepare a particulate average size particle which will achieve rapid extraction during tablet disintegration. It has been found that average particle sizes of about 50 to about 850 microns is preferred to achieve maximum flavor intensity. Particles above 850 microns are not desired since such large particles result in a tablet having a grainy texture. A more preferred average particle size range are particle sizes of 200 to 800 microns. When the fused product is prepared by dry mixing under heat, the product should have a preferred weight ratio of at least 3 parts of hydrophilic polymer to 1 part flavoring agent. Lower ratios, that is ratios of less than 3 to 1 of hydrophilic polymer to flavoring agent result in the formation of an unacceptable product having a paste consistency, which material is difficult to process at room temperatures.

An alternate process for preparing the hydrophilic polymer-flavor agent combination which avoids the aforementioned process difficulties involves the use of an organic solvent to dissolve the polymer and flavoring agent. The organic solvent may be selected from any low boiling solvent that can be easily removed from the reactants by conventional means. Illustrative solvents include methylene chloride, ethyl alcohol, and methyl alcohol. A sweetening agent, such as those described below may be optionally slurred into the resulting solution which will result in the formation of a coated particle having both sweetening and flavoring properties. The reactants should be agitated to prepare a homogenous mixture. Upon completion of mixing the solvent may be removed by standard means, such as vacuum drying and the product recovered. Other routine processing methods may also be employed to dry the resulting product, such as spray-drying, drum-drying, slab-drying, oven drying, tray-drying, pan-drying or other well known drying techniques. The resulting novel flavoring composition may be ground such as by milling to the desired particle size described above for subsequent incorporation into a tablet formulation.

Once the flavoring composition is prepared, it may be incorporated into an otherwise conventional pressed tablet formulation. The amount of flavoring agent that can be used is in an amount of about 0.05% to about 10% and preferably about 1.0% to about 5% by weight, based on the weight of the total tablet formulation. The exact amount of flavoring agent employed is normally a matter of preference subject to such factors as flavor type, base type and strength desired.

The flavoring agents useful to prepare the flavoring compositions of this invention may be derived from synthetic flavor oils and/or oils derived from plants, leaves, flowers, fruits, and so forth, and combinations thereof. Representative flavor oils include peppermint oil, spearmint oil, cinnamon oil, and oil of wintergreen (methyl salicylate). Also useful are natural or synthetic fruit flavors, such as citrus oils including lemon, orange, grape, lime, and grapefruit, and fruit essences including apple, strawberry, cherry, pineapple and so forth.

The pressed tablet into which the flavoring compositions are incorporated may be prepared by both wet granulation, dry granulation and direct compression methods. Each of these methods involve conventional procedures well known to the ordinary skilled artisan. In general wet granulation involves mixing milled powders, preparing a wet mass by blending the milled powders with a binder solution, coarse screening the wet mass and drying the moist granules, screening the granules through a 14 to 20 mesh screen, mixing the screened granules with lubricants and disintegrate agents and finally tablet compressing the mass. In contrast, dry granulation generally involves milling of powders, compression into large hard tablets to make slugs, screening of slugs, mixing with lubricants and disintegrating agents and finally tablet compression. In the direct compression method, the milled ingredients are mixed and then merely tabletted by compression.

The pressed tablet ingredients used in the invention are selected from those materials routinely used. In particular such ingredients primarily include sweeteners, lubricants, and optional coloring agents, binders and fillers.

Sweetening agents may be selected from a wide range of materials such as water-soluble sweetening agents, water-soluble artificial sweeteners, and dipeptide based sweeteners, including mixtures thereof. Without being limited to particular sweeteners, representative illustrations encompass:

A. Water-soluble sweetening agents such as monosaccharides, disaccharides and polysaccharides such as xylose, ribose, glucose, mannose, galactose, lactose, fructose, dextrose, sucrose, sugar, maltose, partially hydrolyzed starch, or corn syrup solids and sugar alcohols such as sorbitol, xylitol, mannitol and mixtures thereof.

B. Water-soluble artificial sweeteners such as the soluble saccharin salts, i.e. sodium or calcium saccharin salts, cyclamate salts and the like, and the free acid form of saccharin.

C. Dipeptide based sweeteners include L-aspartyl-L-phenylalanine methyl ester and materials described in U.S. Pat. No. 3,492,131 and the like.

In general, the amount of sweetener will vary with the desired amount of sweetener selected. This amount will normally be about 0.001% to about 98% by weight when using an easily extractable sweetener. The water-soluble sweeteners described in category A are preferably used in amounts of about 75% to about 98% by weight, and most preferably about 80% to about 95% by weight of the final tablet composition. In contrast, the artificial sweeteners described in categories B and C are used in amounts of about 0.01% to about 5.0% and most preferably about 0.05% to about 0.25% by weight of the final tablet composition. These amounts are necessary to achieve a desired level of sweetness independent from the flavor level achieved from the flavor oil.

Lubricants are used in the tablet formulations in order to ease the ejection of the tablet from the die, to prevent sticking of the tablets to the punches and to limit wear on dies and punches. Lubricants may be selected from a wide range of materials such as magnesium stearate, calcium stearate, zinc stearate, hydrogenated vegetable oils, talc, light mineral oil, sodium benzoate, sodium lauryl sulfate, magnesium lauryl sulfate and mixtures thereof. Magnesium stearate is the preferred lubricant in view of its ready availability and efficient lubrication properties.

The lubricants should be in as fine a state of subdivision as possible since the smaller the particle size the greater the efficiency in the granulation. Preferred sizes are those that pass through an 80 or 100 mesh screen and most preferred through a 200 mesh screen before use. The amount of lubricant will vary broadly and is preferably from about 0.1% to about 5% by weight of the total composition.

Colorants should be selected from materials that are unaffected by higher temperatures and are considered optional ingredients in the tablet formulations. Such materials when used are employed in amounts of 0 to about 0.03% by weight of the total formulation.

Binders that are used when a wet granulation process is employed include starch, pregelatinized starch, gelatin, free polyvinylpyrrolidone, methylcellulose, sodium carboxymethylcellulose, polyvinylalcohols and so forth. Binders when used can be employed in amounts up to about 25% and preferably about 5 to about 15% by weight. Conventional fillers may also be present such as calcium sulfate, dicalcium phosphate, tricalcium phosphate, starch, microcrystalline cellulose and so forth in amounts up to about 50% by weight with preferred amounts from about 5 to 20% by weight of the final formulation.

The pressed tablet formulations are prepared by conventional means using standard techniques and equipment known to those skilled in the art. A preferred procedure of preparing the tablets of this invention involves the direct compression method described above.

In a typical embodiment the flavoring composition in the form of a particulate solid is blended with the tablet formulation ingredients. Once incorporated mixing is continued until a uniform mixture is obtained and thereafter the mixture is formed into suitable shapes by subjecting the formulation to a tabletting operation. Compression pressures on the order up to 12 tons per square inch are normally employed.

The following examples are given to illustrate the invention, but are not deemed to be limiting thereof. All percentages given throughout the specification are based upon weight unless otherwise indicated.

EXAMPLE 1

Inventive Run I

This Example demonstrates a method for preparing the hydrophilic polymer-flavor product used in this invention.

To a sealed container is added 30 grams of powdered polyvinylpyrrolidone (PVP). Peppermint flavor oil (5 grams) is slowly added to the PVP and blended by mechanical stirring. The mixture is heated to around 150° C. and maintained at this temperature until a homogeneous product is obtained, approximately 5 minutes. The product is cooled to approximately −70° C. to prepare a brittle material suitable for grinding. The product is then removed and ground to a fine particle size of less than 840 microns. A stable PVP-flavor oil product is recovered which is useable as a flavor releasing agent.

EXAMPLE 2

Inventive Run 2

This Example demonstrates a method for preparing the hydrophilic polymer-flavor product of this invention in the presence of sweetening agents.

To a container having a sigma shaped blade mixer is added 600 grams of crystalline sorbitol as the sweetening agent. To the container is then added a previously prepared solution containing 24 grams peppermint flavor oil and 72 grams polyvinylpyrrolidone both dissolved in 300 milliliters methylene chloride at 35° C. This mixture is added slowly to the sorbitol with mixing, and mixing is continued for approximately 5 minutes to prepare a homogenous mixture. Vacuum is applied to remove the methylene chloride solvent. The resulting solid product is sieved to a free flowing powder consistency having an average size of less than 840 microns.

EXAMPLE 3

Inventive Run 3 and Comparative Run A

This Example demonstrates the preparation of a pressed mint containing the flavoring composition of Example 2.

In a V-shaped mixer, 470 grams particulate sorbitol, 28.5 grams of the PVP-flavor composite of Example 2, and 1.5 grams of magnesium stearate as the lubricant are added and mixed for 30 minutes. The resulting mixture is then pressed into tablets using 6 tons of pressure in a Manesty B3B type press. The individual tablets weighed 1.7 grams. In control Run A the flavor oil was added as free peppermint oil on the same weight basis as the bound flavor oil, namely 0.15% by weight. The formulations are recited in Table I.

In order to demonstrate the merit of this invention, the two products were aged without being packaged at 37° C. for eight weeks. The results are presented in Table II. Compared to the conventional pressed mint tablets, the product made using the PVP encapsulated flavor consistently retained a significantly higher concentration of the flavor and were found to be consistently uniform with time. At room temperature, the test products retained practically 10% of the flavor after 3 weeks. On the other hand, the control product lost over 50% of the flavor. Results are set forth in Table II and represent the average result obtained from 10 individual tablets. This experiment established that the products made according to this invention were superior and more uniform.

TABLE I

| | % Weight | |
|---|---|---|
| Substance | Control | PVP-flavor Adsorbate |
| Sorbitol | 94.45 | 94.0 |
| Magnesium Stearate | 0.3 | 0.3 |
| Peppermint Oil | 0.15 | — |
| PVP-flavor adsorbate* | — | 5.7 |
| Sorbitol (free) | 5.1 | — |

*Contains 0.15% peppermint oil, 5.1% of sorbitol and 0.45% PVP.

TABLE II

| Samples | Particle Size* | Storage Conditions | % Total Flavor Remaining | | |
|---|---|---|---|---|---|
| | | | 1 Week | 3 Weeks | 8 Weeks** |
| Control | — | Room | 56.7 | 47.2 | Tablet disintegrated |
| Control | — | 37° | 50.9 | 40.3 | 28.0 |
| Test 1 | C | Room | 92.4 | 94.5 | Tablet disintegrated |
| Test 1 | C | 37° | 92.8 | 97.7 | 60.1 |
| Test 2 | F | Room | 80.0 | 106.6 | Tablet disintegrated |
| Test 2 | F | 37° | 67.7 | 93.6 | 76.0 |

*Particle size defined as follows for flavor composite particles:
Coarse (C): 100% passes through #14 mesh screen but is retained on #20 mesh screen (U.S. standard screen)
Fine (F): 100% passes through #30 mesh screen but is retained on #60 mesh screen (U.S. standard screen)

The invention being thus described, it will be obvious that the same may be varied in many ways. Such variations are not to be regarded as a departure from the spirit and scope of the invention and all such modifications are intended to be included within the scope of the following claims.

What is claimed is:

1. A flavored pressed tablet having a high degree of flavor release, which comprises a tablet formulation containing about 0.05% to about 10% by weight of a flavoring composition based on the weight of the total tablet formulation, said flavoring composition comprising a flavoring agent and a hydrophilic polymer, said hydrophilic polymer being characterized by
   (a) being water-soluble,
   (b) being soluble in organic solvent,
   (c) having a viscosity below 100 cps, 10% by weight, at 25° C. in water, and
   (d) being compatible with the flavoring agent
wherein the tablet formulation contains the following ingredients:
   (a) sweetener in the amount of about 75% to about 98%,
   (b) lubricant in the amount of about 0.1% to about 5% and
   (c) colorants in the amount of about 0 to about 0.03% by weight, all % being based on the weight of the total tablet formulation.

2. The flavored pressed tablet of claim 1 wherein the flavoring composition is present in the amount of about 1% to about 5% by weight.

3. The flavored pressed tablet of claim 1 wherein the flavoring composition is in the form of finely ground particles having an average particle size between 200 and 850 microns.

4. The flavored pressed tablet of claim 1 wherein the hydrophilic polymer is polyvinyl-pyrrolidine.

5. The flavored pressed tablet of claim 1 wherein the flavoring agent comprises natural or synthetic oils.

6. The flavored pressed tablet of claim 1 wherein the flavoring agent is selected from the group consisting of peppermint oil, spearmint oil, cinnamon oil, oil of wintergreen, fruit flavors and mixtures thereof.

7. The flavored pressed tablet of claim 1 wherein the flavoring composition is coated on a sweetening agent.

8. A process for preparing a flavored pressed tablet which comprises incorporating a flavoring composition in the form of a particulate solid into a tablet formulation in the amount of about 0.05% to about 10% by weight, based on the weight of the total formulation, admix the ingredients until a uniform mixture is obtained and thereafter forming the mixture into suitable shapes by subjecting the formulation to a tabletting operation, wherein said flavoring compsition comprising a flavoring agent and a hydrophilic polymer, said hyroplic polymer being characterized by
   (a) being water-soluble,
   (b) being soluble in organic solvent,
   (c) having a viscosity below 100 cps, 10% by weight, at 25° C. in water, and
   (d) being compatible with the flavoring agent
wherein the tablet formulation contains:
   (a) sweetener in the amount of about 75% to about 98%,
   (b) lubricant in the amount of about 0.1% to about 5% and
   (c) colorant in the amount of about 0 to about 0.03% by weight, all % being based on the weight of the total tablet formulation.

* * * * *